(12) United States Patent
Gray

(10) Patent No.: US 7,604,033 B2
(45) Date of Patent: Oct. 20, 2009

(54) MULTI-PURPOSE SQUEEGEE AND CUTTING TOOL

(76) Inventor: Robert Louis Gray, 2430 Fair Oaks Blvd., Sacramento, CA (US) 95825

( * ) Notice: Subject to any disclaimer, the term of this patent is extended or adjusted under 35 U.S.C. 154(b) by 0 days.

(21) Appl. No.: 12/115,459

(22) Filed: May 5, 2008

(65) Prior Publication Data

US 2008/0307599 A1 Dec. 18, 2008

Related U.S. Application Data

(60) Provisional application No. 60/927,780, filed on May 4, 2007.

(51) Int. Cl.
*B32B 37/00* (2006.01)
(52) U.S. Cl. .................. 156/510; 156/574; 156/579
(58) Field of Classification Search .................. 156/71, 156/510, 574, 579, 580; 15/245, 245.1
See application file for complete search history.

(56) References Cited

U.S. PATENT DOCUMENTS

| 4,784,598 | A | * | 11/1988 | Kranz et al. | 425/458 |
| 5,865,945 | A | * | 2/1999 | McConaughy | 156/579 |
| 6,453,970 | B1 | * | 9/2002 | Stone et al. | 156/579 |
| 7,225,848 | B2 | * | 6/2007 | Williams | 156/574 |
| 2005/0241090 | A1 | * | 11/2005 | Bogman | 15/121 |

* cited by examiner

*Primary Examiner*—James Sells
(74) *Attorney, Agent, or Firm*—Daniel R. Richardson

(57) ABSTRACT

The present invention discloses a multi-purpose squeegee and cutting tool for use by the human hand. The tool meets the continuing need to be able to apply adhesive films to smooth surfaces without capturing air bubbles, creases in the film or adhesive lumps between the film and the surface. There have been a number of tools used and patented to accomplish this task. The disclosed invention is a new and novel multi-purpose tool that can be used to remove creases in the film, bubbles and lumps while having a built-in knife for piercing bubbles, cutting and trimming the adhesive film.

3 Claims, 1 Drawing Sheet

MULTI-PURPOSE SQUEEGEE AND CUTTING TOOL

CROSS-REFERENCE TO RELATED APPLICATIONS

Provisional Application for: SQUEEGEE KING
No. 60/927,780
Filed Date May 4, 2007

STATEMENT REGARDING FEDERALLY SPONSORED RESEARCH

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC

Not Applicable

BACKGROUND OF THE INVENTION (1) Field of the Invention

There is a continuing need to be able to apply adhesive films to smooth surfaces without capturing air bubbles, creases in the film or adhesive lumps between the film and the surface. Since the adhesive film inadvertently traps air as it is applied to the surface, there is a real need for a tool that fits conveniently in the human hand and enables the smoothing and removal of such bubbles and lumps.

The principal tool in use for such a task is an edge made from a firm yet yielding compound that allows reasonable pressure and movement without tearing the adhesive film. As films tear easily, the smoothing process is primarily accomplished through manually applying the edge by hand across the surface of the film.

Since films are rarely the same size as the surface they are applied to, there is also a continuing need to conveniently pierce such bubbles or to trim off the excess film while working to remove creases, folds, bubbles and lumps trapped under the film.

(2) Description of Related Art including information disclosed under 37 CFR 1.97 and 1.98

As noted, since the adhesive film tears or distorts readily, many solutions for this problem teach a curved edge, primarily arcuate in shape. A prime example of such a tool is found in U.S. Pat. No. 7,225,848 issued Jun. 5, 2007 to Robert D. Williams, "Film Applicator Tool with Arcuate Edges". This patent presumes the tool is held in the hand, and it is formed in a roughly triangular shape in order to have the arcuate angles for working edges.

BRIEF SUMMARY OF THE INVENTION

There have been a number of tools used and patented to accomplish this task. The disclosed invention is a new and novel approach that combines a useful multi-purpose tool that can be used to remove creases in the film, bubbles and lumps while having a built-in knife for cutting and trimming the adhesive film.

DETAILED DESCRIPTION OF THE INVENTION

Figure 1:
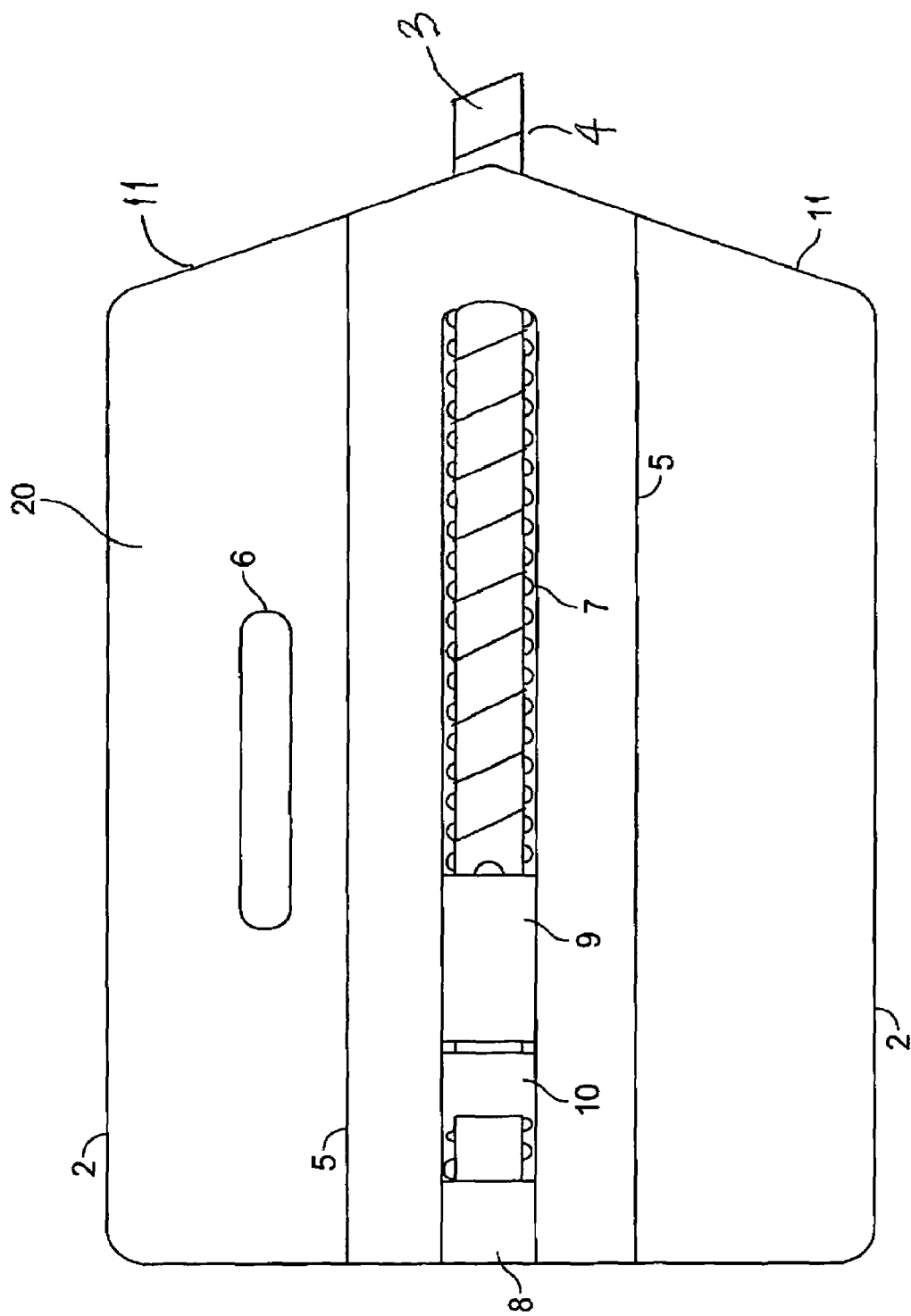
FIG. 1—is a top view of the hand-tool invention showing the enclosed built-in blade

The squeegee is commonly used in the sign and graphic display business for a number of applications such as, applying vinyl graphic films on windows, media signs, banners, truck and car decals. It is also used to transfer application tape to the vinyl.

In the past, squeegee type tools were used to smooth out and flatten any defects visible to the eye in an adhesive film, such as bubbles and creases. Often bubbles and creases can not be taken out, with the squeegee presently used in the sign trade, without the use of additional tools such as a razor or stick pin to pop or cut creases.

However, during the course of using the present commonly used squeegee, the process is slowed a great deal, when one has to stop, and grab another tool, such as a razor, to pop a bubble, lift wrinkled vinyl, or cut a crease. This can not be achieved, with the present commonly used squeegee. There are several types of cutting blades on the market, used in conjunction with the common squeegee.

The present invention, a hand-tool 20 with squeegee-type working edges (2 and 11) is a unique design to fit comfortably in the hand, with an incorporated blade. The shape is designed for the working edges (2 and 11) to better fit square corners while the tool 20 is still comfortable to hold by hand. The working edges (2 and 11) of the hand tool 20 are comprised of flexible plastics, such as polyethylene, vinyl and nylon. These edges are tapered to allow a flat application to the smooth surface receiving the adhesive film, while still allowing the tool to be gripped by the hand at an angle.

The working edges (2 and 11), are strong enough to maintain their rigid strength, but are not "sharp" so as to cut or tear the adhesive films being applied to the surfaces. The preferred embodiment for the hand-tool 20 is a nylon-based material specifically designed to resist the usual wear-down of plastics that are in common use.

In addition to the preferred embodiment, it is anticipated that the hand-tool 20 could be manufactured from materials comprising polypropylene, rubber, leather, impregnated or laminated fibrous materials, plasticized materials, cardboard, paper, or others. Ribbed plastic from various composites are used to give the tool 20 a clean edge, strong memory, rigid flex and high glide, ideal for pressure-sensitive sign applications.

The following drawings depict the preferred embodiment. However, it is anticipated that there could be several variations of the preferred embodiment, including different blade types, such as a "utility" type blade, razor blades, as well as mounting the blade 3 on top of the tool 20, at an angle in the tool 20, or other convenient positioning for use.

FIG. 1 shows a top view of the hand-tool invention 20. The hand-tool invention 20 has four working edges, the top edge 2, the bottom edge 2, and the two angled edges 11. It is anticipated that there will be an imprint area 6 which will carry the brand name or space for the owner to put their own name for identification of ownership. The hand-tool invention 20 has two raised ridges 5 on the top of center and the bottom of center. These raised ridges 5 are for the comfort of the hand using the tool 20 as well as providing a better grip of the tool 20 when in use. While several types of blades can be used with the hand-tool invention 20, the blade 3 shown here is the common break-off type with seams 4 where the used portion can be broken off and a fresh portion of the blade extended. This type of blade requires blade adjustable notches 7, to enable adjusting the blade length, a blade stop tab 8, to prevent the blade from extending out the rear of the tool 20, and a tool adjustment tab 9 with a blade lock tab 10.

The hand-tool invention 20 has four working edges, the top edge 2, the bottom edge 2, and the two angled edges 11. The hand-tool invention 20 has two raised ridges 5 on the top of center and the bottom of center. These raised ridges 5 are for the comfort of the hand using the tool 20 as well as providing a better grip of the tool 20 when in use. While several types of blades can be used with the hand-tool invention 20, the blade 3 shown here is the common break-off type with seams 4 where the used portion can be broken off and a fresh portion of the blade extended. This type of blade requires a blade stop tab 8, to prevent the blade from extending out the rear of the tool 20.

The hand-tool invention 20 has four working edges, shown here as the top edge 2, the bottom edge 2, and the two angled edges 11 up front (from FIG. 1 perspective, to the right of the hand tool 20). The hand-tool invention 20 has two raised ridges 5 on the top of the tool 20 to the left of center and to the right of center. These raised ridges 5 are for the comfort of the hand using the tool 20 as well as providing a better grip of the tool 20 when in use. This FIGURE also shows the same ridges 5 on the bottom of the tool to the left of center and to the right of center. The blade 3 shown here is positioned in the center of the tool 20. Also shown is the tool adjustment tab 9 mounted on top of the tool 20 and the blade 3.

The blade 3 shown here (FIG. 1) is protruding from the center of the tool 20. Also shown is the tool adjustment tab 9 mounted on top of the tool 20 along with the blade lock tab 10, and the blade stop tab 8.

The tapered side edges 2 are shown on either side of center and extending to the ends of the tool 20. The hand-tool invention 20 has two raised ridges 5 on the top of the tool 20 to the top of center and to the bottom of center. These raised ridges 5 are for the comfort of the hand using the tool 20 as well as providing a better grip of the tool 20 when in use. The same ridges 5 are on the bottom of the tool (not shown). The blade stop tab 8 is shown mounted to the rear of the tool 20.

I claim:

1. A multi-purpose hand tool for applying films to surfaces, comprising:
    a roughly rectangular shaped hand tool body, having a top side, a bottom side, a rear side, and a protruding center on one side, with four rounded corners, comfortably fitting in the adult human hand, having two parallel sides perpendicular to the rear side of said hand tool, and each of said two parallel sides running from one rounded corner at the rear side of said hand tool to the rounded base of each of two angled front sides of said hand tool, each of said angled front sides running in a forward angled direction from one of said rounded corners of said parallel sides to a convergent point in the protruding center of the front side of said hand tool;
    two sets of raised ridges, one set of raised ridges on the top side and one set of raised ridges on the bottom side of said hand tool body, and each raised ridge of a set of two raised ridges being offset to either side of the center of said hand tool body and each said raised ridge being rounded on top, running from the back of said hand tool body, and running parallel with the said two parallel sides of said hand tool body, and terminating at each of said angled front sides of said hand tool body;
    said hand tool body being thickest between and inclusive of said two sets of raised ridges and running from the rear side along the center of said hand tool body, and tapering along a gradual smooth angle from the outside raised ridge of each of said set of two raised ridges, to each of the respective said two parallel sides, forming working edges along said two parallel sides;
    said hand tool body being the thickest between and inclusive of said two sets of raised ridges and running from the rear side along the center of said hand tool body, and tapering near the front of said hand tool body to each of said angled front sides of said hand tool body, forming working edges along said two angled sides; and
    said hand tool body incorporating into said thickest portion of said hand tool body, a straight segmented knife blade, extending from the blade stop tab mounted at the rear side of said hand tool body, and running along the center of said hand tool body, said knife blade having adjustable notches, said knife blade having a tool adjustment tab, said knife blade having a lock tab and said knife blade having means to extend beyond said protruding center point of said two front angled sides.

2. The multi-purpose hand tool for applying films to surfaces according to claim 1
    wherein said knife blade is not segmented.

3. The multi-purpose hand tool for applying films to surfaces according to claim 1
    wherein said knife blade does not run along the center of said hand tool body and
    extends beyond one of said front angled sides.

* * * * *